United States Patent
Bayles et al.

(10) Patent No.: US 10,309,303 B2
(45) Date of Patent: Jun. 4, 2019

(54) SYSTEMS AND METHODS OF GENERATING ELECTRICAL POWER

(71) Applicant: Hamilton Sundstrand Corporation, Charlotte, NC (US)

(72) Inventors: Robert A. Bayles, Belvidere, IL (US); Todd A. Spierling, Rockford, IL (US); Louis J. Bruno, Ellington, CT (US); Harold W. Hipsky, Charlotte, NC (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 125 days.

(21) Appl. No.: 15/236,085

(22) Filed: Aug. 12, 2016

(65) Prior Publication Data

US 2018/0045114 A1    Feb. 15, 2018

(51) Int. Cl.
| | |
|---|---|
| *F02C 6/00* | (2006.01) |
| *F02C 6/08* | (2006.01) |
| *F01D 15/10* | (2006.01) |
| *F02C 3/04* | (2006.01) |
| *H02K 7/18* | (2006.01) |
| *F02C 7/32* | (2006.01) |

(52) U.S. Cl.
CPC .............. *F02C 6/08* (2013.01); *F01D 15/10* (2013.01); *F02C 3/04* (2013.01); *F02C 7/32* (2013.01); *H02K 7/1823* (2013.01); *F05D 2220/50* (2013.01)

(58) Field of Classification Search
CPC .... F01D 15/10; F02C 3/04; F02C 6/08; F05D 2220/50; H02K 7/1823
USPC ................ 290/52; 322/44; 60/776, 792, 785
See application file for complete search history.

(56) References Cited

U.S. PATENT DOCUMENTS

| | | | |
|---|---|---|---|
| 6,257,003 B1 * | 7/2001 | Hipsky .................. | B64D 13/06 62/402 |
| 6,634,596 B2 * | 10/2003 | Albero .................... | B64D 13/06 244/53 A |
| 7,059,136 B2 | 6/2006 | Coffinberry | |
| 8,118,253 B1 * | 2/2012 | Casado Abarquero ...................... | B64D 41/00 244/58 |
| 8,146,370 B2 | 4/2012 | Zeiner et al. | |
| 2006/0010875 A1 | 1/2006 | Mahoney et al. | |
| 2014/0352324 A1 * | 12/2014 | Ernst ........................ | F02C 7/18 60/806 |

FOREIGN PATENT DOCUMENTS

FR    2944259 A1    10/2010

OTHER PUBLICATIONS

Extended European Search Report received from European Patent Office (EPO) dated Jan. 17, 2018 for Application No. EP17185791.5.

* cited by examiner

Primary Examiner — Julio C. Gonzalez
(74) Attorney, Agent, or Firm — Locke Lord LLP; Scott D. Wofsy; Judy R. Naamat

(57) ABSTRACT

A generator arrangement includes a generator and a pneumatic turbine. The pneumatic turbine is operably connected to the generator. A gas turbine engine compressor section is in fluid communication with the pneumatic turbine through a bleed air conduit to provide pressurized air to the pneumatic turbine for applying mechanical rotation to the generator.

17 Claims, 4 Drawing Sheets

SYSTEMS AND METHODS OF GENERATING ELECTRICAL POWER

BACKGROUND OF THE INVENTION

1. Field of the Invention

The present disclosure relates to electrical systems, and more particularly to electrical generator arrangements for electrical systems.

2. Description of Related Art

Vehicles such as aircraft commonly include generators connected to the aircraft electrical system for providing electrical power to power-consuming devices carried by the vehicle. Examples of such generators include energy storage devices, main generators, auxiliary power unit generators, and emergency power generators.

Energy storage devices generally receive electrical power from other power sources, such as main generators, auxiliary power unit generators, and/or ground power connections when available. Main generators and auxiliary power unit generators generally receive mechanical power from a main engine. The mechanical power is typically communicated to the generator through a rotating transmission element, which converts the mechanical rotation into electrical power. Emergency power generators typically receive power outside of the aircraft, such as from fluid flow external to the aircraft. When needed as a source of emergency or supplemental power, the emergency power generator is deployed from the aircraft into the surrounding airstream, which drives the blades to rotate the generator to extract energy from the airstream. As power requirements for aircraft systems increase, the power generation requirement serviced by such generators increases.

Such conventional methods and systems have generally been considered satisfactory for their intended purpose. However, there is still a need in the art for improved electrical power sources for aircraft electrical systems. The present disclosure provides a solution for this need.

SUMMARY OF THE INVENTION

A generator arrangement includes a generator and a pneumatic turbine. The pneumatic turbine is operably connected to the generator. A gas turbine engine compressor section is in fluid communication with the pneumatic turbine through a bleed air conduit to provide pressurized air to the pneumatic turbine for applying mechanical rotation to the generator.

In certain embodiments, a compressor section of a gas turbine engine can be in fluid communication with the pneumatic turbine. A shaft can connect the pneumatic turbine with the generator. A gearbox can connect the pneumatic turbine with the generator. The generator arrangement can be separated from the external environment by a belly or engine fairing. A shutoff valve can be in fluid communication with the pneumatic turbine. A coolant conduit can fluidly connect the pneumatic turbine with the generator to provide an expanded bleed air flow discharged by the pneumatic turbine as a coolant flow to the generator for cooling the generator.

In accordance with certain embodiments, a bleed air conduit can be in fluid communication with the pneumatic turbine. A flow control valve can be in fluid communication with the pneumatic turbine. A crossover conduit can be in fluid communication with the pneumatic turbine. A cross bleed valve can be in fluid communication with the pneumatic turbine. The bleed air conduit can be a first bleed air conduit, and a second bleed air conduit can be in fluid communication with the crossover conduit.

It is also contemplated that, in accordance with certain embodiments, a heat exchanger can be in fluid communication with the pneumatic turbine through the generator. An electrical load can be in thermal communication with the heat exchanger through a liquid coolant conduit. A high voltage direct current power converter can be in electrical communication with the generator. The generator can be a first generator the pneumatic turbine can be operably connected to a second generator. The pneumatic turbine can be a high pressure pneumatic turbine and a low pressure turbine can be in series between the high pressure pneumatic turbine and the generator.

An electrical system includes a first generator arrangement and a second generator arrangement as described above. A bleed air conduit is in fluid communication with the pneumatic turbine of the first generator arrangement. A cross-bleed conduit is in fluid communication with the bleed air conduit and is in selective fluid communication with the pneumatic turbine of the second generator arrangement such that working fluid from a single gas turbine engine compressor section can provide pressurized working fluid to either or both the generators of the first generator arrangement and the second generator arrangement.

In the certain embodiments, the bleed air conduit can be a first bleed air conduit and further comprising a second bleed air conduit. The second bleed air conduit can be in fluid communication with the pneumatic turbine of the second generator arrangement. A shutoff valve can be fluid communication with the pneumatic turbine of the first generator arrangement and the pneumatic turbine of the second generator arrangement. The generator arrangements can be separated from the external environment by a separate belly fairings.

In accordance with further embodiments, a first gas turbine engine compressor section can be in fluid communication with the pneumatic turbine of the first generator arrangement. A second gas turbine engine compressor section can be in fluid communication with the pneumatic turbine of the second generator arrangement. The cross-bleed conduit can fluidly connect the first gas turbine compressor section with the pneumatic turbine of the second generator arrangement. The cross-bleed conduit can fluidly connect the second gas turbine compressor section with the pneumatic turbine of the first generator arrangement.

A method of generating electrical power includes compressing a working fluid using a gas turbine engine. The compressed working fluid is flowed to a turbine disposed externally of the of the gas turbine engine. The compressed working fluid is expanded in a turbine, the turbine extracting work from the turbine. The extracted work is applied to a generator and electrical power is generated by the generator. The electrical power is provided to a power bus, supplementing primary electrical power provided to the power bus. In embodiments, primary power provided to the bus is provided by a generator operably connected to the gas turbine engine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
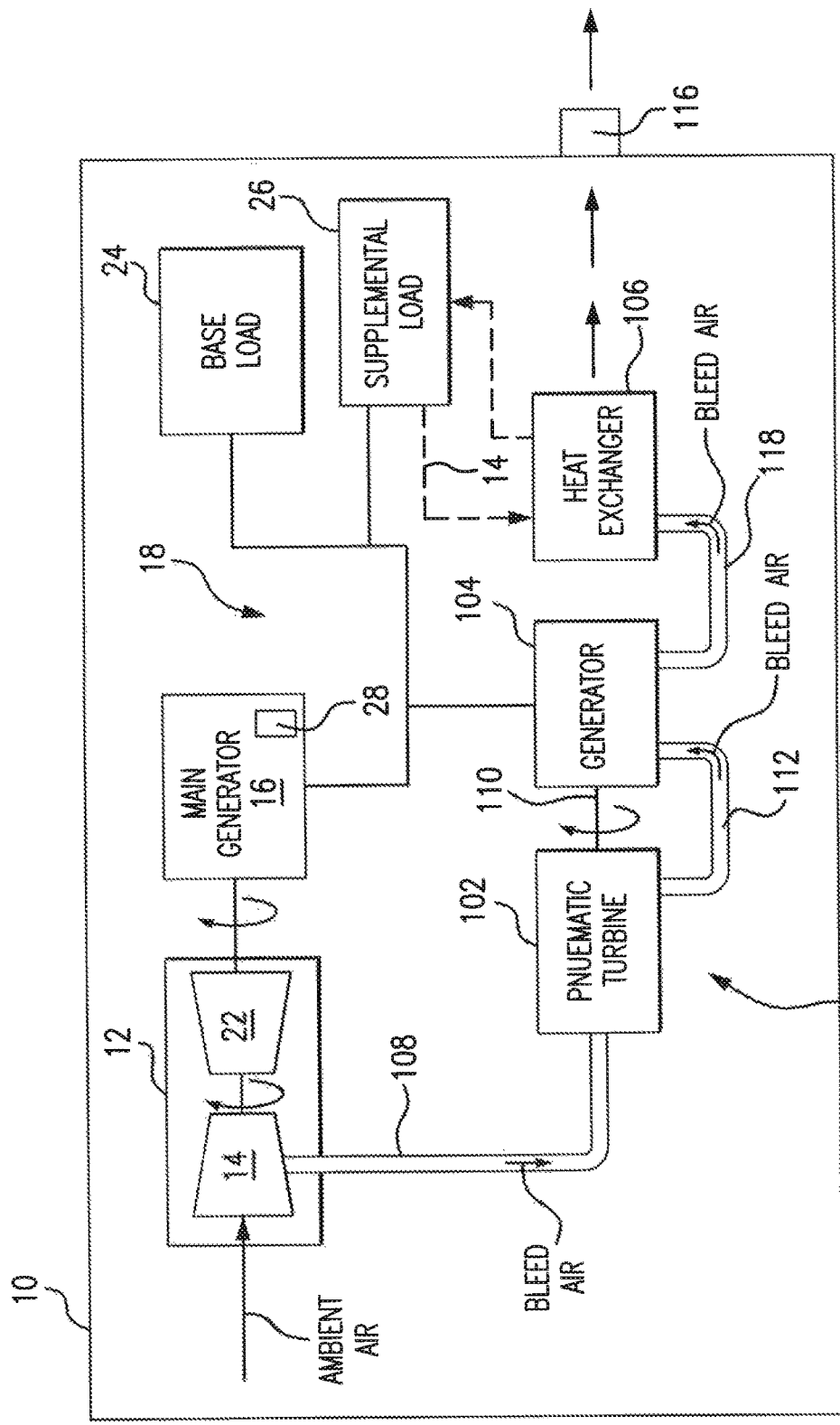
FIG. 1 is a schematic plan view of an exemplary embodiment of an aircraft electrical system constructed in accordance with the present disclosure, showing a generator arrangement in electrical communication with an electrical load through the electrical system.

Reference will now be made to the drawings wherein like reference numerals identify similar structural features or aspects of the subject disclosure. For purposes of explanation and illustration, and not limitation, a partial view of an exemplary embodiment of an electrical generator arrangement in accordance with the disclosure is shown in FIG. 1 and is designated generally by reference character 100. Other embodiments of electrical generator arrangements, electrical systems including such electrical generator arrangements, and aircraft carrying such electrical systems in accordance with the disclosure, or aspects thereof, are provided in FIGS. 2 and 3, as will be described. The systems and methods described herein can be used providing supplemental electrical power to aircraft electrical systems, though the present disclosure is not limited to supplemental electrical power systems or to aircraft in general.

Referring to FIG. 1, an aircraft 10 is shown. Aircraft 10 includes a gas turbine engine 12 with a compressor section 14, a main generator 16, an electrical system 18, and a generator arrangement 100. Gas turbine engine 12 includes a compressor section 14 and a turbine section 22. Compressor section 14 is configured and adapted to compress air ingested from the ambient environment and provides compressed air to turbine section 22. Turbine section 22 introduces fuel into the compressed air, generates high pressure combustion products by igniting the fuel, and expands the high pressure combustion products, extracting work from the high pressure combustion products. Turbine section 22 provides the work to main generator 16, which generates electrical power.

Main generator 16 applies the electrical power to electrical system 18. Electrical system 18 provides the electrical power to base electrical load 24, which includes electrical devices such as avionics and flight control devices. Electrical system 18 also provides the electrical power to a supplemental electrical load 26, which may include electronics (e.g., radar) that consume significant amounts of electrical power. It is contemplated that supplemental electrical load 26 may consume a greater amount of electrical power than base electrical load 24. It is also contemplated that supplemental electrical load 26 can, individually or in combination with base electrical load 24, exceed an electrical generating capability 28 of main generator 16.

Generator arrangement 100 includes a pneumatic turbine 102, a generator 104, and a heat exchanger 106. Pneumatic turbine 102 is in fluid communication with compressor section 14 through a bleed air conduit 108. Bleed air conduit 108 provides high pressure air to pneumatic turbine 102, which expands the high pressure air, extracts work from the expanding high pressure air, and applied the extracted work to generator 104 through a shaft 110 to generator 104. Generator 104 converts the mechanical work received through shaft 110 into electrical power, which generator 104 applies to electrical system 18 for powering either or both of base electrical load 24 and supplemental electrical load 26.

Pneumatic turbine 102 also provides the expanded bleed air to generator 104 through a generator coolant conduit 112, which generator 104 uses to cool components within generator 104 requiring coolant, e.g., lubricant, windings, etc. Thereafter, generator 104 provides the bleed air to heat exchanger 106 through a heat exchanger conduit 118, which transfers heat from a supplemental electrical load coolant loop 114 into the bleed air prior to discharging the bleed air through an overboard vent 116.

In this respect generator arrangement 100 is configured and adapted to provide electrical power to electrical system 18 for purposes of powering either or both of base electrical load 24 and supplemental electrical load 26. Moreover, generator arrangement 100 is configured and adapted to increase the electrical power generating capability of aircraft 10 using existing sources of mechanical power carried by aircraft 10 in a baseline or 'green' configuration, e.g., gas turbine engine 12. As will be appreciated by those of skill in the art in view of present disclosure, this can simplifies the customization and/or certification of aircraft carrying supplemental electrical loads requiring electrical generating capability beyond that provided in the 'green' configuration.

Figure 2:
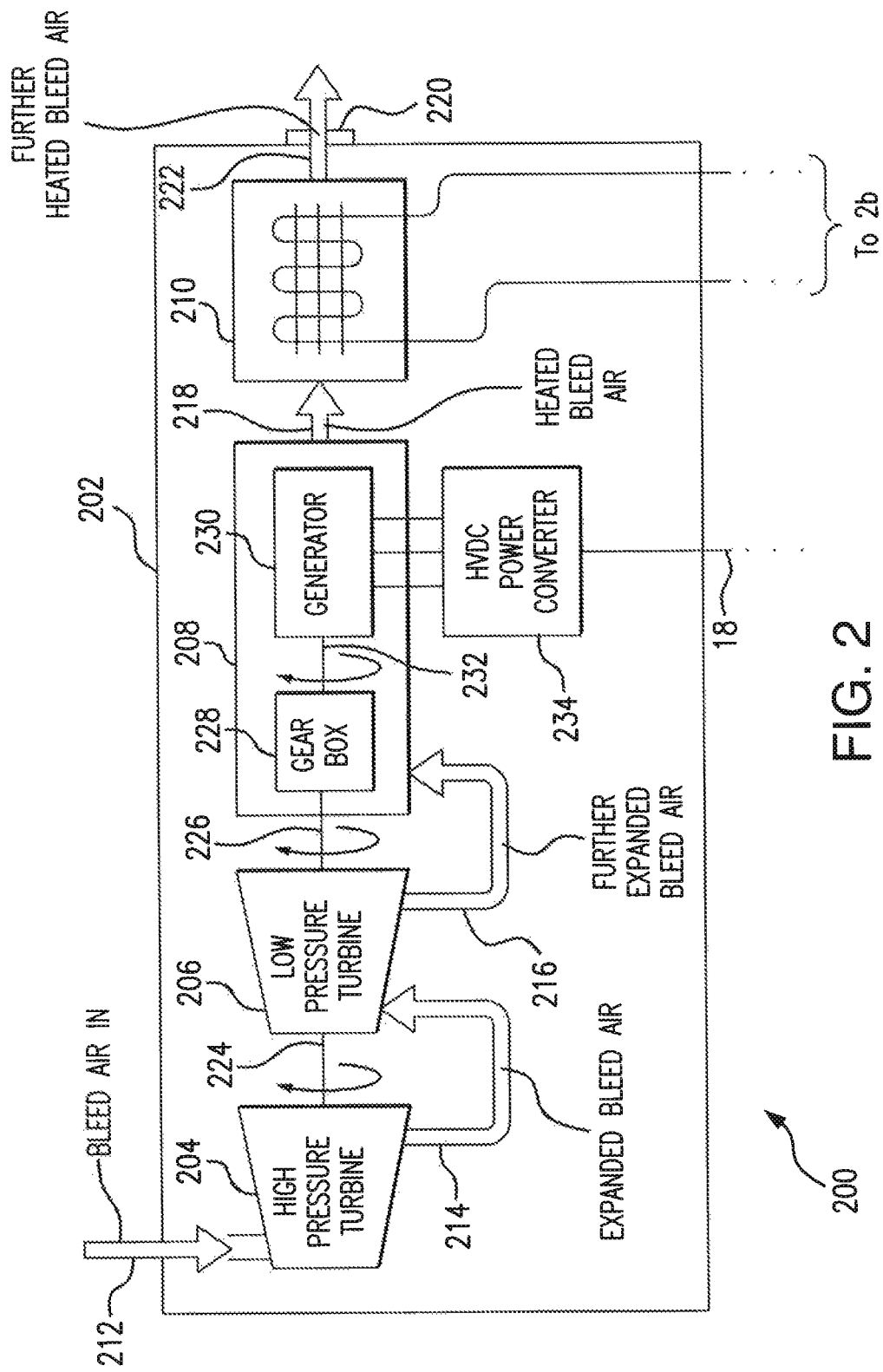
FIG. 2 is a schematic view of the generator arrangement of FIG. 1 according to an embodiment, showing a generator arrangement including a high pressure pneumatic turbine and a low pressure pneumatic turbine.

With reference to FIG. 2, a generator arrangement 200 is shown. Generator arrangement 200 is similar to generator arrangement 100 and is additionally packaged within a fairing 202. Fairing 202, which can be a belly fairing or an engine fairing, separates generator arrangement 200 from the environment external to fairing 202. This allows for generator arrangement 200 to exceed the volume available within aircraft 10 (shown in FIG. 1).

Generator arrangement 200 includes a high pressure pneumatic turbine 204, a low pressure pneumatic turbine 206, a generator module 208, and heat exchanger 210. A bleed air conduit 212 is in fluid communication with high pressure pneumatic turbine 204. High pressure pneumatic turbine 204 is in fluid communication with low pressure pneumatic turbine 206 through a high pressure turbine discharge conduit 214, which is in fluid communication with low pressure pneumatic turbine 206. Low pressure pneumatic turbine 206 is in fluid communication with generator module 208 through a low pressure turbine discharge conduit 216. Generator module 208 is in fluid communication with heat exchanger 210 through a generator module discharge conduit 218. Heat exchanger 210 is in fluid communication through an overboard vent 220 through a heat exchanger discharge conduit 222.

High pressure pneumatic turbine 204 receives bleed air from compressor section 14 (shown in FIG. 1), expands the bleed air, extracts work form the expanded bleed air, and provides the expanded bleed air to low pressure pneumatic turbine 206 through high pressure turbine discharge conduit 214. High pressure pneumatic turbine 204 applies the work to low pressure pneumatic turbine 206 through a shaft 224.

Low pressure pneumatic turbine 206 further expands the expanded bleed air, extracts additional work from the further expanded bleed air, and provides the further expanded bleed air to generator module 208 as coolant through low pressure turbine discharge conduit 216. Low pressure pneumatic turbine 206 applies the work to generator module 208 through a shaft 226.

Generator module 208 includes a gearbox 228 and a generator 230. Gearbox 228 is connected to shaft 226. Gearbox 228 is also connected to generator 230 through a shaft 232. Gearbox 228 receives the work extracted from high pressure pneumatic turbine 204 and low pressure turbine 206 through shaft 226 as mechanical rotation, and converts the mechanical rotation to a rotational speed suitable for generator 230, which gearbox 228 applies to generator 230.

Generator 230 converts the mechanical rotation received through shaft 226 into electrical power, which in the illustrated exemplary embodiment is variable frequency alternating current (AC) power. The AC power is applied to a high voltage direct current (HVDC) power converter 234, which converts the AC power into HVDC power and applies the HVDC power to electrical system 18.

Figure 3:
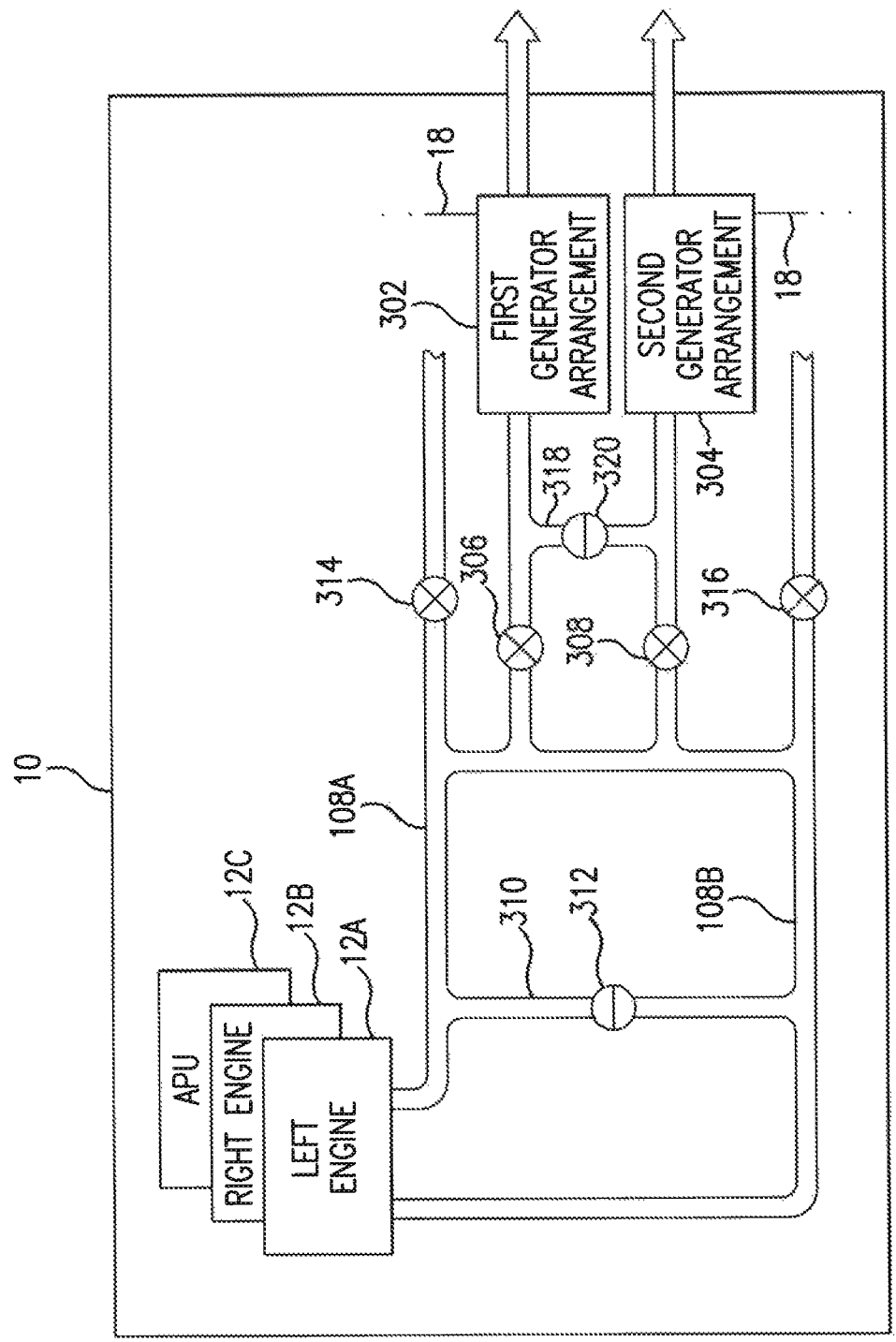
FIG. 3 is a schematic view of the electrical system of FIG. 1 according to another embodiment, showing first and second electrical generator arrangements each connectable to a first bleed conduit and a second bleed conduit.

With reference to FIG. 3, an electrical system 300 is shown. Electrical system 300 includes a first generator arrangement 302 and a second generator arrangement 304. First generator arrangement 302 and second generator arrangement 304 are similar to electrical generator arrangement 100 (shown in FIG. 1) and are in electrical communication with electrical system 18. Being in electrical communication with electrical system 18, either or both of first generator arrangement 302 and second generator arrangement 304 provide electrical power to supplemental electrical load 26 and/or base electrical load 24.

In the illustrated exemplary embodiment aircraft 10 includes a left gas turbine engine 12A, a right gas turbine engine 12B, and an auxiliary power unit (APU) 12C. Left gas turbine engine 12A, right gas turbine engine 12B, and APU 12C as similar to gas turbine engine 12 (shown in FIG. 1). A first bleed air conduit 108A and a second bleed air conduit 108B are both in fluid communication with one or more of left gas turbine engine 12A, right gas turbine engine 12B, and APU 12C. For example first bleed air conduit 108A can be connected to the compressor section of left gas turbine engine 12A and second bleed air conduit 108B can be connected to the compressor section of right gas turbine engine 12B. In certain embodiments, first bleed air conduit 108A and second bleed air conduit 108B can be connected to a common compressor section, e.g., the compressor section of left gas turbine engine 12A, right gas turbine engine 12B, or APU 12C.

First bleed air conduit 108A is in fluid communication with first generator arrangement 302. A first flow control valve 306 is interposed between the compressor section and first generator arrangement 302 along first bleed air conduit 108A. Second bleed air conduit 108B is in fluid communication with second generator arrangement 304 and includes a second flow control valve 308. Second flow control valve 308 is interposed between the compressor section and second generator arrangement 304. It is contemplated that first flow control valve 306 and second flow control valve 308 are arrangement to balance flow from the compressor section(s) to provide motive flows of high pressure bleed air to first generator arrangement 302 and second generator arrangement 304.

A crossover conduit 310 with a crossover valve 312 fluidly connects first bleed air conduit 108A with second bleed air conduit 108B. Crossover valve 312 is configured and adapted to place both of first generator arrangement 302 and second generator arrangement 304 in fluid communication with a common compressor section. For example, in certain embodiments, both first generator arrangement 302 and second generator arrangement 304 receive motive flows of high pressure bleed air from APU 12C. This allows for supplemental electrical load 26 (shown in FIG. 1) to be powered by APU 12C, which can in turn be started and stopped as necessary during flight for purposes of powering supplemental electrical load 26. First bleed air conduit 108A can include a first supply valve 314 and second bleed air conduit 108B can include second supply valve 316 for providing bleed air for other aircraft systems, e.g., anti-ice/de-ice systems and/or an environmental control system (not show for reasons of clarity).

In the illustrated exemplary embodiment, a second crossover conduit 318 is connected between first bleed air conduit 108A and second bleed air conduit 108B downstream of crossover conduit 310. Second crossover conduit 318 includes a second crossover conduit flow control valve 320, which allows for balancing the flow of pressurized bleed air provided to the first generator arrangement 302 and the second generator arrangement 304.

Figure 4:
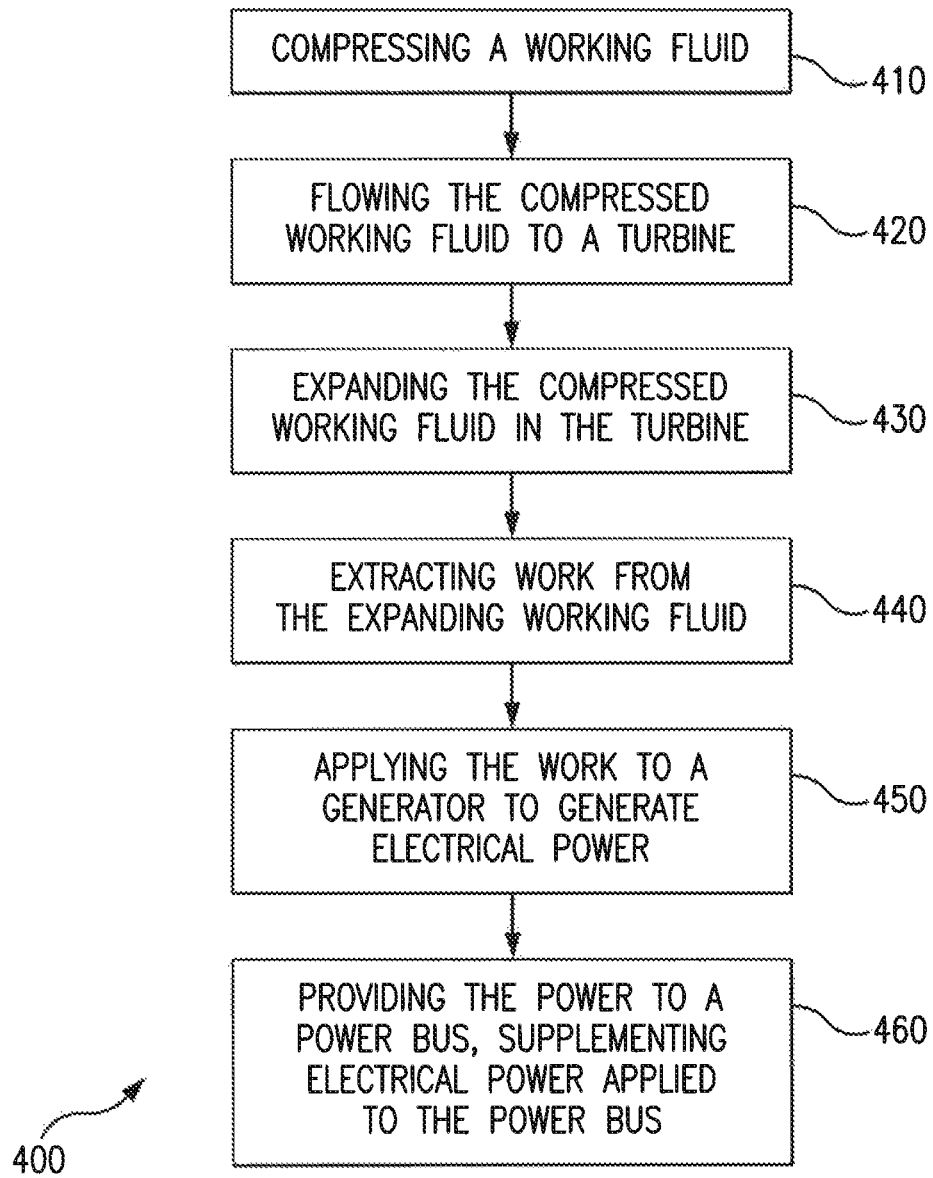
FIG. 4 is a block diagram of providing electrical power to an electrical system, showing operations of the method.

With reference to FIG. 4, a method of generating supplemental electrical power 400 is shown. Method 400 includes compressing a working fluid using a gas turbine engine, e.g., gas turbine engine 12 (shown in FIG. 1), as shown with box 410. The compressed working fluid is flowed to a pneumatic turbine, e.g., pneumatic turbine 102 (shown in FIG. 1), disposed externally of the of the gas turbine engine, as shown with box 420. The compressed working fluid is expanded in the pneumatic turbine, as shown with box 430, and the pneumatic turbine extracts work from the turbine, as shown with box 440.

The pneumatic turbine applies the extracted work to a generator, e.g., generator 104 (shown in FIG. 1), and the generator generates electrical power, as shown with box 450. The electrical power is provided to a power bus, e.g., electrical system 18 (shown in FIG. 1), supplementing primary electrical power provided to the power bus by a main generator, e.g., main generator 16 (shown in FIG. 1), as shown with box 460. It is contemplated that the electrical power can correspond the power required by a supplemental electrical load, e.g., supplemental electrical load, e.g., supplemental electrical load 26 (shown in FIG. 1), which can be commensurate in size to a base electrical load of an aircraft electrical system, e.g., electrical load 24 (shown in FIG. 1).

The methods and systems of the present disclosure, as described above and shown in the drawings, provide for aircraft electrical systems with superior properties including increased electrical power generation capability using available sources of aircraft energy. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A generator arrangement of a power system, comprising:
   a first generator assembly having a first pneumatic turbine operably connected to a first generator;
   a second generator assembly having a second pneumatic turbine operably connected to a second generator;
   a first bleed air conduit fluidly connecting a first gas turbine engine with the first generator assembly;

a second bleed air conduit fluidly connecting a second gas turbine engine with the second generator assembly, a first and a second coolant conduits providing a bleed air flow of high pressure air discharged by the respective first and second gas turbine engine in the same direction to the first and second respective generator assemblies;

a crossover conduit connected between the first bleed air conduit and the second bleed air conduit; and a crossover valve disposed along the crossover conduit configured to control the bleed air flow in the crossover conduit to selectively place both of the first and second generator assemblies in fluid communication with a common compressor section of the first and second gas turbine engines.

2. The generator arrangement as recited in claim 1, further comprising a fuselage, a belly fairing, or an engine fairing separating the first and second generator assemblies from the external environment.

3. The generator arrangement as recited in claim 1, further comprising a first shaft connecting the first pneumatic turbine with the first generator and a second shaft connecting the second pneumatic turbine with the second generator.

4. The generator arrangement as recited in claim 1, further comprising a gearbox connecting the first pneumatic turbine with the first generator and a second shaft connecting the second pneumatic turbine with the second generator.

5. The generator arrangement as recited in claim 1, further comprising at least one flow control valve in fluid communication with the first and second gas turbine engines.

6. The generator arrangement as recited in claim 1, further comprising a second crossover conduit in fluid communication with the first and second pneumatic turbines.

7. The generator arrangement as recited in claim 1, further comprising a second crossover valve disposed along the second crossover conduit configured to control fluid flow in the second conduit to selectively allow for fluid communication with the first pneumatic turbine, the second pneumatic turbine, or both the first and second pneumatic turbines.

8. The generator arrangement as recited in claim 1, further comprising a shutoff valve in fluid communication with the first and second pneumatic turbines.

9. The generator arrangement as recited in claim 1, wherein the first coolant conduit is fluidly connected to the first pneumatic turbine with the first generator, the coolant conduit providing an expanded bleed air flow discharged by the first pneumatic turbine as a coolant flow for cooling the first generator.

10. The generator arrangement as recited in claim 1, further comprising a high voltage direct current power converter in electrical communication with the first generator.

11. The generator arrangement as recited in claim 1, wherein the first pneumatic turbine is operably connected to the second generator.

12. The generator arrangement as recited in claim 1, further comprising a heat exchanger in fluid communication with the first pneumatic turbine through the first generator.

13. The generator arrangement as recited in claim 1, wherein the second pneumatic turbine in is fluid communication with the first pneumatic turbine and is operably connected to the second generator.

14. The generator arrangement as recited in claim 1,
wherein the first coolant conduit is fluidly connected to the first pneumatic turbine with the first generator, the coolant conduit providing an expanded bleed air flow discharged by the first pneumatic turbine as a coolant flow for cooling the first generator;

a high voltage direct current power converter in electrical communication with the first generator; and a heat exchanger in fluid communication with the first pneumatic turbine through the first generator, wherein the first pneumatic turbine is operably connected to the second generator.

15. An electrical system, comprising:
a first generator assembly having a first pneumatic turbine operably connected to a first generator;

a second generator assembly baying a second pneumatic turbine operably connected to a second generator;

a first gas turbine engine having a first compressor section;

a second gas turbine engine having a second compressor section;

a first bleed air conduit fluidly connecting the first gas turbine engine with the first generator assembly;

a second bleed air conduit fluidly connecting the second gas turbine engine with the second generator assembly;

a first and a second coolant conduits providing a bleed air flow of high pressure air discharged by the respective first and second gas turbine engines in the same direction to the first and second respective generator assemblies;

a crossover conduit connected between the first bleed air conduit and the second bleed air conduit; and a crossover valve disposed along the crossover conduit configured to control the bleed air flow to either or both of the first and second pneumatic turbines;

wherein the cross-bleed conduit is configured to provide the bleed air flow to either or both of the first and second pneumatic turbines, fluidly connect the first gas turbine compressor section with the second pneumatic turbine, and fluidly connects the second gas turbine compressor section with the first pneumatic turbine.

16. The electrical system a recited in claim 15, wherein the first generator is separated from the external environment by a first belly fairing, wherein the second generate is separated from the external environment by a second belly fairing.

17. The electrical system as recited in claim 15, further comprising a shutoff valve in fluid communication with the first pneumatic turbine and the second pneumatic turbine of the second generator arrangement.

* * * * *